United States Patent
Takubo

(10) Patent No.: US 11,275,651 B2
(45) Date of Patent: Mar. 15, 2022

(54) MEMORY CONTROLLER AND FLASH MEMORY SYSTEM

(71) Applicant: TDK CORPORATION, Tokyo (JP)

(72) Inventor: Kenichi Takubo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/161,899

(22) Filed: Jan. 29, 2021

(65) Prior Publication Data
US 2021/0248034 A1 Aug. 12, 2021

(30) Foreign Application Priority Data
Feb. 7, 2020 (JP) .............................. JP2020-019687

(51) Int. Cl.
| | | |
|---|---|---|
| G06F 11/10 | (2006.01) | |
| G06F 11/30 | (2006.01) | |
| G06F 11/14 | (2006.01) | |
| G06F 11/07 | (2006.01) | |

(52) U.S. Cl.
CPC ...... *G06F 11/1068* (2013.01); *G06F 11/0766* (2013.01); *G06F 11/1471* (2013.01); *G06F 11/3037* (2013.01)

(58) Field of Classification Search
CPC ............. G06F 11/1068; G06F 11/0766; G06F 11/1471; G06F 11/3037
USPC ....... 714/764, 766, 768, 769, 773, 774, 784, 714/799; 711/104, 113, 114, 147, 153
See application file for complete search history.

(56) References Cited

U.S. PATENT DOCUMENTS

| | | | | |
|---|---|---|---|---|
| 8,677,058 | B2 * | 3/2014 | Jung | G06F 12/0246 711/103 |
| 11,169,721 | B2 * | 11/2021 | Byun | G06F 3/0673 |
| 2012/0198131 | A1 * | 8/2012 | Tan | G06F 12/0246 711/103 |
| 2012/0246391 | A1 * | 9/2012 | Meir | G11C 16/349 711/103 |

(Continued)

FOREIGN PATENT DOCUMENTS

| | | |
|---|---|---|
| JP | 2014-517425 A | 7/2014 |
| WO | 2012-174216 A2 | 12/2012 |

OTHER PUBLICATIONS

Li et al., Accelerating garbage collection for 3D MLC flash memory with SLC blocks, Nov. 1, 2019, IEEE, pp. 1-8 (Year: 2019).*

*Primary Examiner* — John J Tabone, Jr.
(74) *Attorney, Agent, or Firm* — Oliff PLC

(57) ABSTRACT

A memory controller includes a control circuit. The control circuit sets each block in a flash memory to an SLC mode or an MLC mode. The control circuit configures blocks set to the SLC mode into a first group. The control circuit configures blocks set to the MLC mode into a second group. The control circuit allocates the blocks constituting the first group to a first data block and a first redundant block. The control circuit allocates the blocks constituting the second group to a second data block and a second redundant block. The control circuit writes data required to be saved into the first data block. The control circuit writes first redundant data into the first redundant block. The control circuit writes replicated data of the data written into the first data block into the second data block. The control circuit writes second redundant data into the second redundant block.

6 Claims, 15 Drawing Sheets

(56) References Cited

U.S. PATENT DOCUMENTS

| | | | |
|---|---|---|---|
| 2016/0041760 A1* | 2/2016 | Kuang | G11C 16/3495 |
| | | | 711/103 |
| 2019/0012260 A1* | 1/2019 | Kawamura | G06F 3/0647 |
| 2020/0097361 A1* | 3/2020 | Suh | G11C 7/06 |
| 2021/0064249 A1* | 3/2021 | Mehta | G06F 3/0634 |
| 2021/0149592 A1* | 5/2021 | Papandreou | G06F 13/1694 |

* cited by examiner

DATA RECOVERY

FIG. 8A

| GROUP CLASSIFICATION | DATA BLOCK 1 | DATA BLOCK 2 | REDUNDANT BLOCK |
|---|---|---|---|
| FIRST GROUP | BLOCK #0 | BLOCK #1 | BLOCK #2 |
| FIRST GROUP | BLOCK #3 | BLOCK #4 | BLOCK #5 |
| FIRST GROUP | BLOCK #6 | BLOCK #7 | BLOCK #8 |

| GROUP CLASSIFICATION | DATA BLOCK 1 | DATA BLOCK 2 | DATA BLOCK 3 | DATA BLOCK 4 | REDUNDANT BLOCK |
|---|---|---|---|---|---|
| SECOND GROUP | BLOCK #100 | BLOCK #101 | BLOCK #102 | BLOCK #103 | BLOCK #104 |
| SECOND GROUP | BLOCK #105 | BLOCK #106 | BLOCK #107 | BLOCK #108 | BLOCK #109 |
| SECOND GROUP | BLOCK #110 | BLOCK #111 | BLOCK #112 | BLOCK #113 | BLOCK #114 |

⋮

MEMORY CONTROLLER AND FLASH MEMORY SYSTEM

CROSS-REFERENCE TO RELATED APPLICATION

This application claims the benefit of Japanese Patent Application No. 2020-019687, filed on Feb. 7, 2020, the entire disclosure of which is incorporated by reference herein.

FIELD

This application relates generally to a memory controller and a flash memory system.

BACKGROUND

With regard to cells of a flash memory, p-bit multiple level cells (MLC) that allow information of p (p is an integer of 2 or more) bits to be stored in each cell have been known. Note that it is common practice that a 2-bit MLC is simply referred to as an MLC and a 3-bit MLC and a 4-bit MLC are referred to as a triple level cell (TLC) and a quadruple level cell (QLC), respectively. In addition, a cell that stores information of one bit in the cell is referred to as a single level cell (SLC).

Examples of the p-bit MLC include a p-bit MLC that can be set to a mode that allows information of q bits, q being smaller than p, to be stored in each cell (although, hereinafter, referred to as a q-bit MLC mode for the sake of simplicity, this mode includes an SLC mode, which will be described later) and a p-bit MLC mode that allows information of p bits to be stored. For example, examples of the MLC include an MLC that can be set to the SLC mode that allows information of one bit to be stored as in the SLC and an MLC mode that allows information of two bits to be stored in each cell.

Writing speed when the q-bit MLC mode is set is faster than writing speed when the p-bit MLC mode is set. Consequently, setting the q-bit MLC mode to a p-bit MLC is a disadvantage in respect of capacity efficiency but an advantage in respect of writing speed. A technology of, taking advantage of the characteristics, using a region to which the q-bit MLC mode is set as a cache in a flash memory constituted by p-bit MLCs has been known.

SUMMARY

In order to achieve the above-described objective, a memory controller according to a first aspect of the present disclosure includes
circuitry, in which
the circuitry
sets a physical block in a flash memory to a first storage mode allowing information of n (n is a positive integer) bits or less to be stored in each cell or a second storage mode allowing information of more than n bits to be stored in each cell,
configures a plurality of first physical blocks set to the first storage mode into a first group,
configures a plurality of second physical blocks set to the second storage mode into a second group,
allocates the plurality of first physical blocks constituting the first group to a first data block and a first redundant block,
allocates the plurality of second physical blocks constituting the second group to a second data block and zero or more second redundant blocks,
writes data required to be saved into the first data block,
writes first redundant data based on the data required to be saved into the first redundant block belonging to a same first group as the first data block,
writes replicated data of the data written into the first data block into the second data block, and
writes second redundant data based on the replicated data into the second redundant block belonging to a same second group as the second data block, and
a ratio of a data amount of the first redundant data to a data amount of the data required to be saved is greater than a ratio of a data amount of the second redundant data to a data amount of the replicated data.

The memory controller may be a memory controller in which
the circuitry further
writes, in conjunction with data to be written into the first data block, a first error-correcting code based on the data into the first data block, and
writes, in conjunction with data to be written into the second data block, a second error-correcting code based on the data into the second data block,
the first error-correcting code is generated using a sector of or a plurality of sectors of data as a unit of processing,
the first redundant data are parity data generated with respect to each piece of data into which a plurality of pieces of data of a unit of processing when the first error-correcting code is generated are collected,
the second error-correcting code is generated using a sector of or a plurality of sectors of data as a unit of processing, and
the second redundant data are parity data generated with respect to each piece of data into which a plurality of pieces of data of a unit of processing when the second error-correcting code is generated are collected.

The memory controller may be a memory controller in which
the circuitry further
performs correction processing of correcting an error included in data written into the first data block or the second data block, based on the first error-correcting code or the second error-correcting code, and
when an error included in data cannot be corrected by the correction processing, recovers data written into the first data block or the second data block, based on the parity data.

The memory controller may be a memory controller in which
the first redundant data are same data as data to be written into the first data block, and,
the circuitry recovers data written into the first data block by reading and acquiring data successfully written into the first redundant block.

The memory controller may further include
a storage storing a group management table for managing the first group and the second group, in which
the circuitry further
writes information indicating a correspondence relationship between a group and a plurality of physical blocks and information indicating an allocation of a data block and an allocation of a redundant block into the group management table, and
referring to the group management table, identifies a data block and a redundant block targeted for data writing.

In order to achieve the above-described objective, a flash memory system according to a second aspect of the present disclosure includes the memory controller and the flash memory.

BRIEF DESCRIPTION OF THE DRAWINGS

A more complete understanding of this application can be obtained when the following detailed description is considered in conjunction with the following drawings, in which:

FIG. 8A is a diagram illustrating an example of a table relating to the cache area in a group management table according to Embodiment 1 of the present disclosure;

FIG. 8B is a diagram illustrating an example of a table relating to the storage area in the group management table according to Embodiment 1 of the present disclosure;

DETAILED DESCRIPTION

Figure 1:
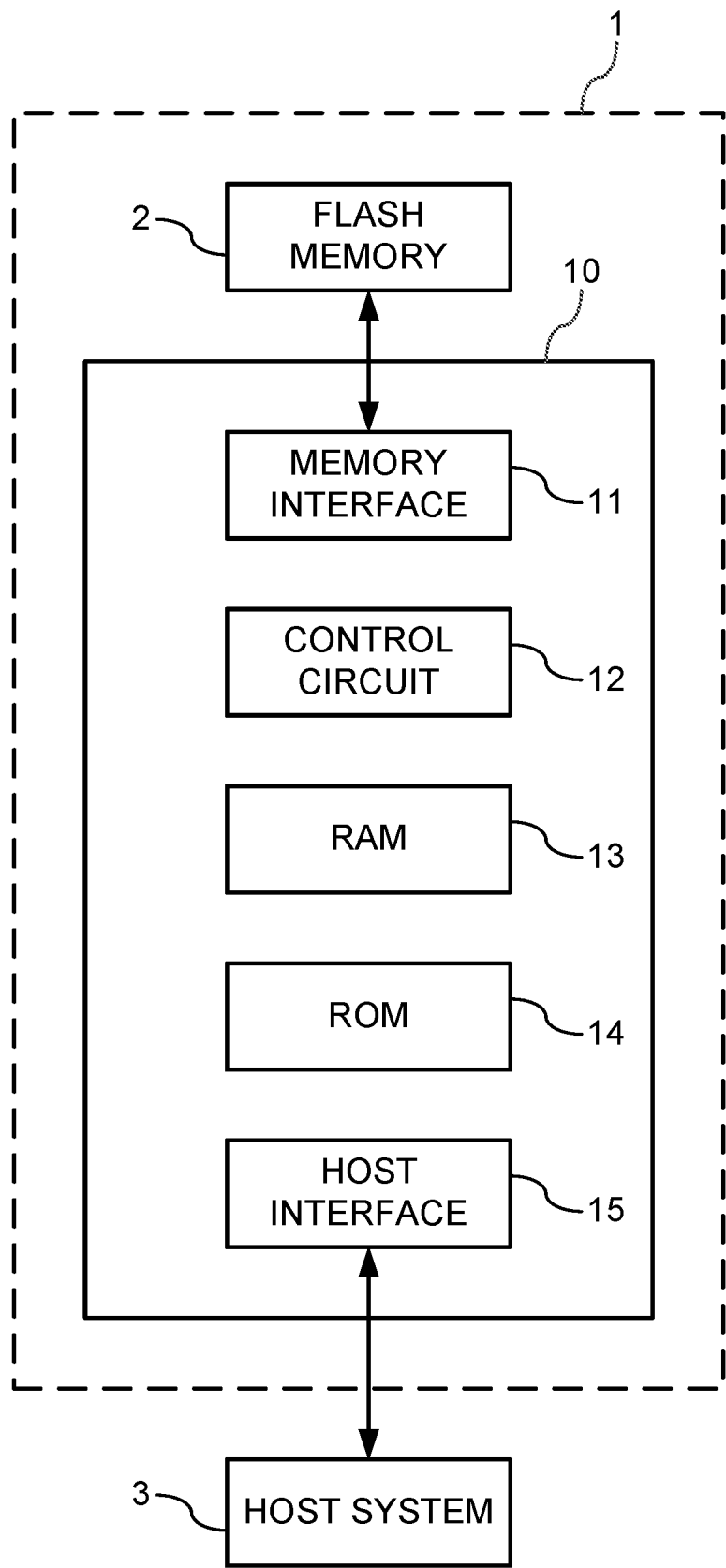
FIG. 1 is a block diagram illustrating a configuration of a flash memory system according to Embodiment 1 of the present disclosure.

Hereinafter, referring to the drawings, a memory controller, a flash memory system, and a flash memory control method according to embodiments of the present disclosure will be described. The same reference signs are assigned to the same or equivalent constituent components in the respective drawings.

Embodiment 1

Referring to FIG. 1, a flash memory system 1 according to Embodiment 1 will be described.

The flash memory system 1 includes a flash memory 2 and a memory controller 10. The flash memory system 1 is connected to a host system 3. The flash memory system 1 is, for example, a solid state drive (SSD) or an embedded multi media card (eMMC). The flash memory system 1 is used as a secondary storage device of the host system 3. The flash memory system 1 is an example of the flash memory system according to the present disclosure.

The flash memory 2 includes one or more flash memory chips. The flash memory 2 is a NAND-type flash memory in Embodiment 1. The NAND-type flash memory 2 reads and writes data in units of a page and erases data in units of a block, which is made up of a plurality of pages. The flash memory 2 is an example of the flash memory according to the present disclosure.

In Embodiment 1, it is assumed that each cell constituting the flash memory 2 is an MLC that is capable of storing information of two bits. It is also assumed that each cell is a cell that can be set to an SLC mode that allows information of one bit to be stored or an MLC mode that allows information of two bits to be stored, controlled by the memory controller 10. Although a smaller amount of information can be stored in a cell operating in the SLC mode than a cell operating in the MLC mode, the cell operating in the SLC mode has a faster writing speed than the cell operating in the MLC mode. These modes are set in units of a block. The SLC mode is an example of a first storage mode according to the present disclosure, and the MLC mode is an example of a second storage mode according to the present disclosure.

Figure 2:
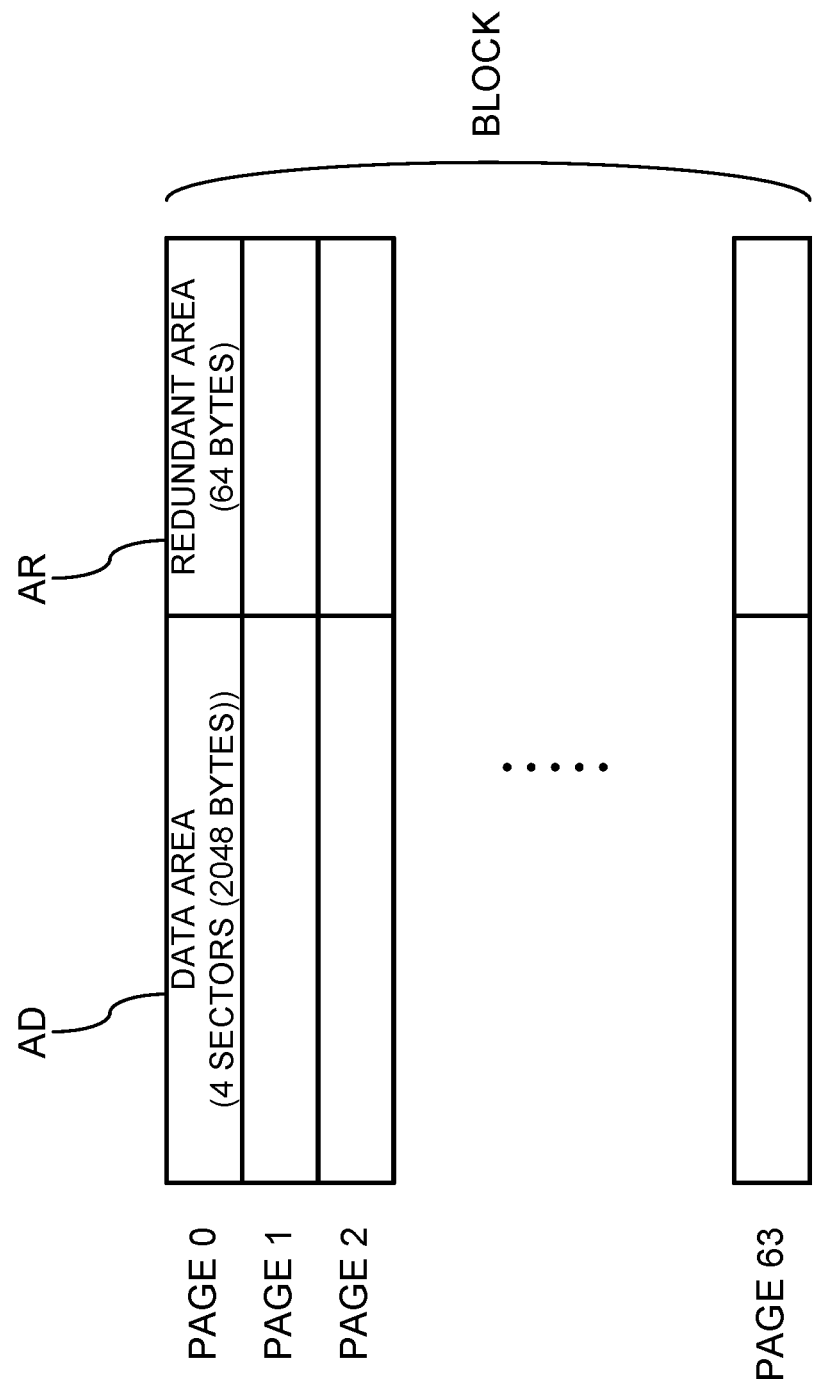
FIG. 2 is a diagram illustrating an example of a block configuration of a flash memory according to Embodiment 1 of the present disclosure.

Referring to FIG. 2, an example of a block configuration of the flash memory 2 will be described. FIG. 2 illustrates a configuration when a block is set to the SLC mode, where a block is made up of 64 pages. On the other hand, when a block is set to the MLC mode, the number of pages in a block is 128 pages. A storage area of one page does not differ between the SLC mode and the MLC mode, and, in both modes, a storage area of one page is made up of a data area AD of 4 sectors (2048 bytes) and a redundant area AR of 64 bytes. Data are written into the data area AD, and information relating to management of the page is written into the redundant area AR. In particular, an error-correcting code for correcting an error occurring in data that are written into the data area AD is written into the redundant area AR. The error-correcting code is, for example, a Reed-Solomon code or a low-density parity-check (LDPC) code.

Note that allocation of the data area AD and the redundant area AR in the respective pages can be freely set. For example, when an error-correcting code of 16 bytes is generated with respect to each piece of data of one sector (512 bytes) and the data and the error-correcting code are successively written, data areas AD of one sector (512 bytes) and redundant areas AR of 16 bytes may be alternately allocated in the storage areas of respective pages in a sequence of a data area AD, a redundant area AR, a data area AD, a redundant area AR, and so on. When an error-correcting code of 32 bytes is generated with respect to each piece of data of two sectors (1024 bytes), data areas AD of two sectors (1024 bytes) and redundant areas AR of 32 bytes may be alternately allocated in the storage areas of respective pages in a sequence of a data area AD, a redundant area AR, a data area AD, a redundant area AR, and so on.

An error included in data written into the flash memory 2 is highly likely to occur at the time of data writing, and it is anticipated that errors occur to the extent that the errors cannot be corrected even using the error-correcting codes.

Note that, in general, a page and a block of a flash memory are also referred to as a physical page and a physical block, respectively. This is to discriminate the physical page and the physical block from a logical page and a logical block that are units in which the host system processes data. Note, however, that, in the following description, a physical page and a physical block are sometimes referred to as a page and a block, respectively, in the operation of writing, reading, or erasure of data into or from a physical page and a physical block of the flash memory 2.

FIG. 1 is referred to again. The memory controller 10 communicates with the host system 3 and controls the flash memory 2. The memory controller 10 writes data received from the host system 3 into the flash memory 2 when receiving a write request from the host system 3 and reads data from the flash memory 2 and transmits the data to the host system 3 when receiving a read request from the host system 3. Details of the configuration of the memory controller 10 will be described later. The memory controller 10 is an example of the memory controller according to the present disclosure.

The memory controller 10 sets some cells (for example, approximately 10 percent) of the respective cells in the flash memory 2 to the SLC mode and uses the cells as a cache area and sets the other cells to the MLC mode and uses the cells as a storage area, which will be described in detail later. The cache area is an area in which data required to be saved are temporarily saved, and the storage area is an area in which data required to be saved are saved for a long period of time. The memory controller 10 first writes data required to be saved into the cache area and subsequently reads the data from the cache area and writes the read data into the storage area when, for example, no request is issued from the host system 3. Data written into the cache area are saved in the cache area in conjunction with parity data generated based on the data, which will be described in detail later. As such, it is possible to achieve high data recovery capability using parity data with respect to data saved in the cache area.

The host system 3 is a host system that uses the flash memory system 1 as a secondary storage device. The host system 3 is, for example, a personal computer or a smartphone.

Next, to facilitate understanding, a flash memory control method performed by the memory controller 10 will be schematically described using a specific example with reference to FIGS. 3 to 6.

Figure 3:
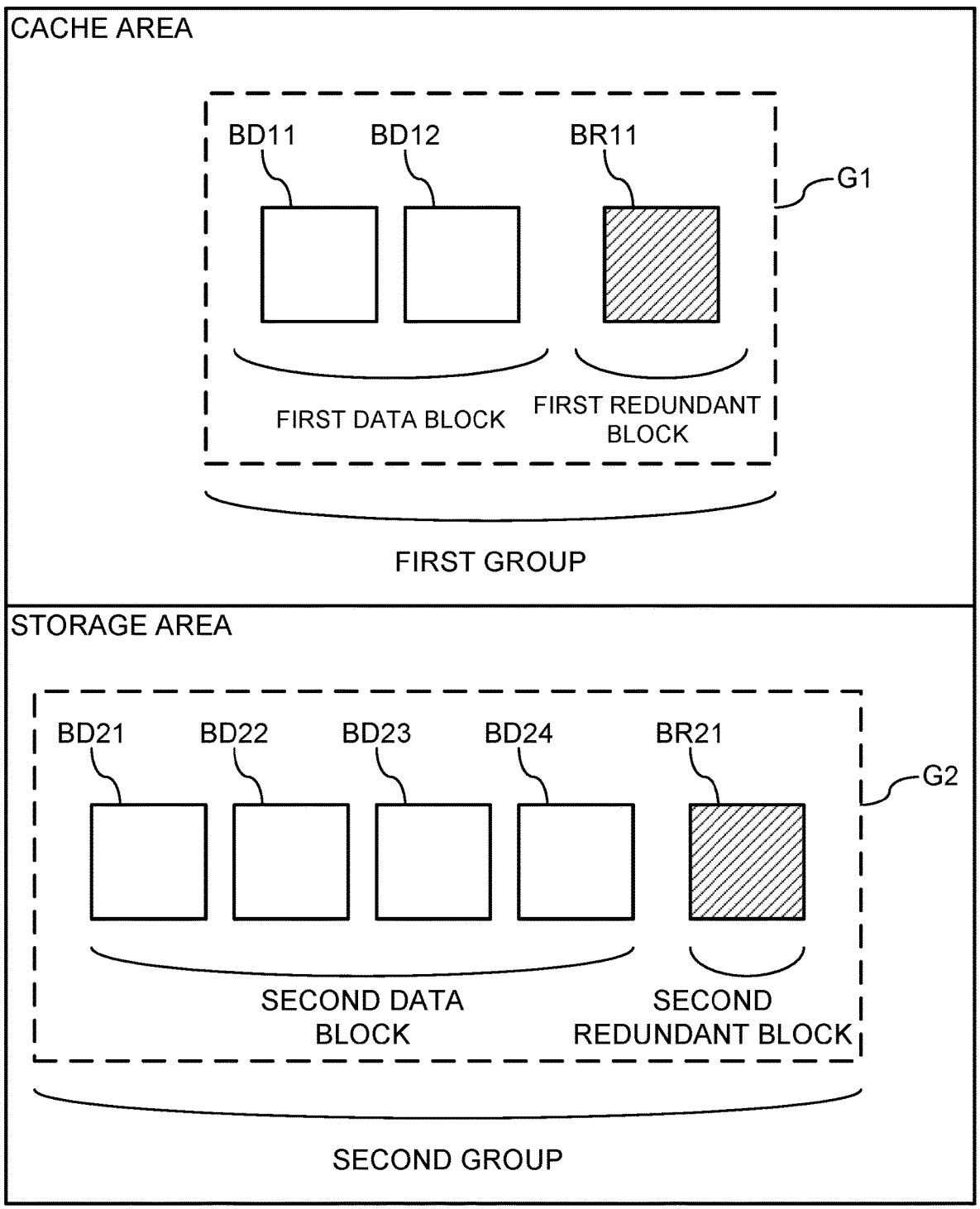
FIG. 3 is a diagram illustrating an example of a first group and a second group configured by a memory controller according to Embodiment 1 of the present disclosure.

First, as illustrated in FIG. 3, the memory controller 10 configures a plurality of blocks in the cache area, which is set to the SLC mode, into a plurality of groups classified as first groups and allocates a plurality of blocks constituting each group to data blocks (first data blocks) and a redundant block (first redundant block). The first data block is a block into which data required to be saved in the cache area are written. The first redundant block is a block into which redundant data for correcting an error occurring in data written into a first data block are written. In the example illustrated in FIG. 3, three blocks are configured into a group G1 classified as a first group, and two blocks are allocated to data blocks BD11 and BD12 and the other block is allocated to a redundant block BR11.

In addition, as with the cache area, the memory controller 10 configures a plurality of blocks in the storage area, which is set to the MLC mode, into a plurality of groups classified as second groups and allocates a plurality of blocks constituting each group to data blocks (second data blocks) and a redundant block (second redundant block). The second data block is a block into which data required to be saved in the storage area are written. The second redundant block is a block into which redundant data for correcting an error occurring in data written into a second data block are written. In FIG. 3, five blocks are configured into a group G2 classified as a second group, and four blocks are allocated to data blocks BD21, BD22, BD23, and BD24 and the other block is allocated to a redundant block BR21. In this allocation, a ratio of a redundant block in a group classified as a second group is configured to be smaller than a ratio of a redundant block in a first group. In other words, redundancy of a group classified as a second group is set lower than redundancy of a group classified as a first group. In FIG. 3, the ratio of a redundant block in the group G1 is 1/3, and the ratio of a redundant block in the group G2 is 1/5. Therefore, the ratio of a redundant block in the group G2 is lower than the ratio of a redundant block in the group G1. In the following description, a case where respective blocks are allocated as illustrated in FIG. 3 will be described.

Next, referring to FIG. 4, an outline of data writing into the cache area performed by the memory controller 10 will be described. First, as illustrated in section (1) of FIG. 4, the memory controller 10 prepares data D11 and D12, which are data required to be saved, in units of a page and generates parity data P11. As used herein, the data required to be saved are basically data for which a write request is issued by the host system 3, and, in addition thereto, data required to be saved due to the convenience of management of the flash memory 2 are also included in the data required to be saved. The data D11 are data of four sectors that are written into a page in the data block BD11, and the data D12 are data of four sectors that are written into the data block BD12. The parity data P11 are data of parity based on the data D11 and D12 and data of four sectors that are written into a page in the redundant block BR11. Hereinafter, the data D11 and D12 and data P11, which are data of parity based on the data D11 and D12, are referred to as data of the same group.

The memory controller 10 calculates parity, based on the data D11 and D12 and thereby generates the parity data P11. The parity calculated based on the data D11 and D12 is, for example, horizontal parity generated by calculating exclusive ORs (XORs) of the bit string of the data D11 and the bit string of the data D12. In other words, the parity is generated by calculating exclusive ORs across pieces of data which is written into each of the data blocks BD11 and BD12. In addition, the memory controller 10 generates an error-correcting code based on the data D11 and an error-correcting code based on the data D12. In other words, in this example, an error-correcting code is generated using four sectors (2048 bytes) of data as a unit of processing.

Figure 4:
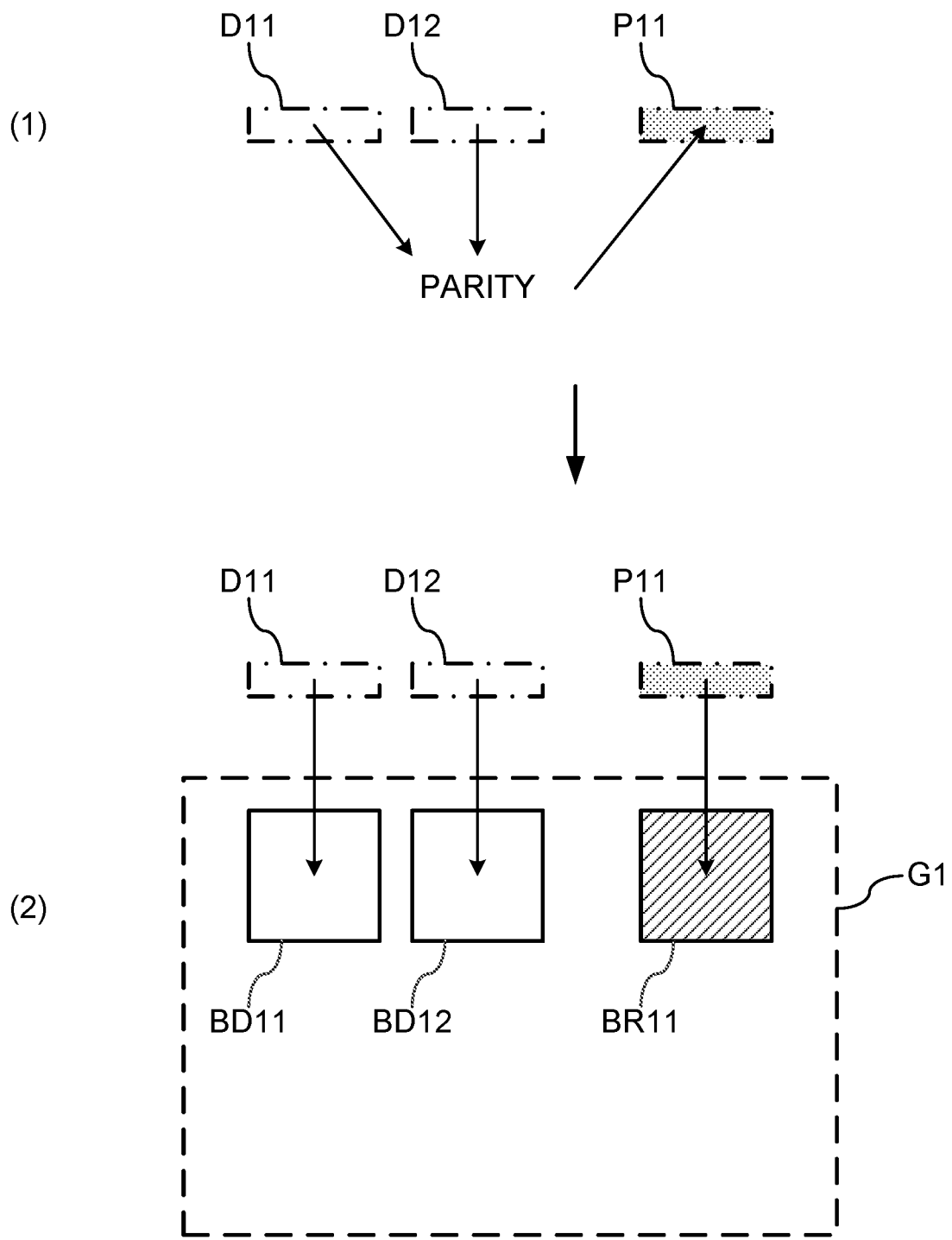
FIG. 4 is a diagram illustrating an outline of data writing into a cache area performed by the memory controller according to Embodiment 1 of the present disclosure.

Next, as illustrated in section (2) of FIG. 4, the memory controller 10 writes the data D11 and D12 into pages in the data blocks BD11 and BD12, respectively, and writes the parity data P11 into a page in the redundant block BR11. On this occasion, each of the data D11 and D12 is written into the data area AD in a corresponding page, and an error-correcting code corresponding to data written into the data area AD in the page is written in the redundant area AR in the page.

Figure 5:
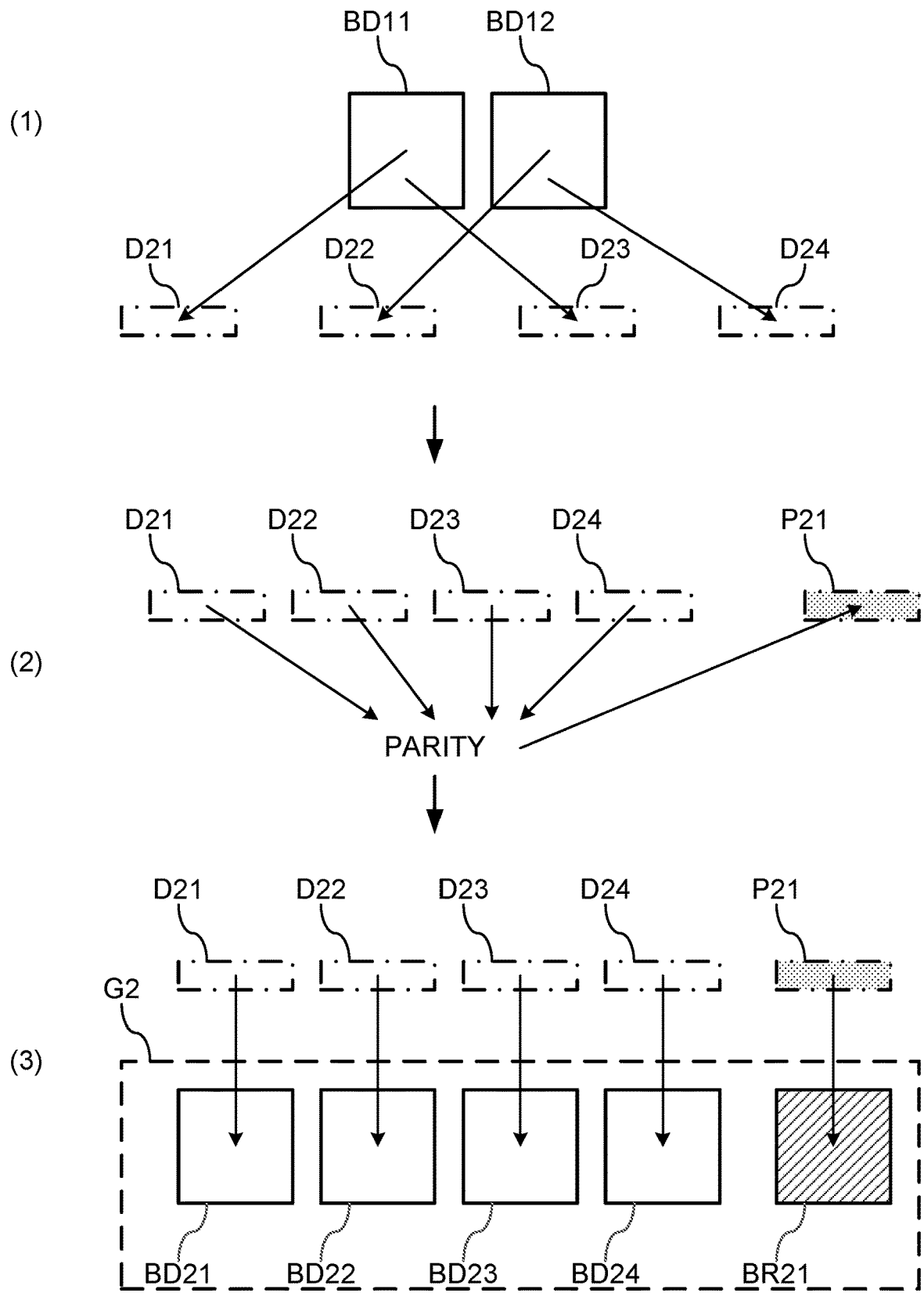
FIG. 5 is a diagram illustrating an outline of data writing into a storage area performed by the memory controller according to Embodiment 1 of the present disclosure.

Next, referring to FIG. 5, an outline of data writing into the storage area performed by the memory controller 10 will be described. First, as illustrated in section (1) of FIG. 5, the memory controller 10 reads data from data blocks in the cache area and prepares data required to be saved in the storage area. In FIG. 5, for example, data read from page 0 in the data block BD11 are prepared as data D21, data read from page 0 in the data block BD12 are prepared as data D22, data read from page 1 in the data block BD11 are prepared as data D23, and data read from page 1 in the data block BD12 are prepared as data D24. Note that two data blocks that are read at the time of data preparation do not necessarily have to belong to the same group. In addition, although, in this example, two pages of data are read from each of the data blocks BD11 and BD12 and the data D21, D22, D23, and D24 are prepared, it may be configured such that a page of data are read from each of four different data blocks BD11, BD12, BD13, and BD14 and data D21, D22, D23, and D24 are prepared.

Next, as illustrated in section (2) of FIG. 5, the memory controller 10, as with the case of the cache area, calculates parity across the data D21, D22, D23, and D24 and thereby generates parity data P21. As illustrated in section (3) of FIG. 5, the memory controller 10, as with the case of the cache area, writes the prepared data D21, D22, D23 and D24 into the data blocks BD21, BD22, BD23, and BD24 in the storage area, respectively, and writes the parity data P21 into the redundant block BR21 in the storage area. On this occasion, into the redundant area AR in each page, an error-correcting code corresponding to data written into the data area AD in the page is also written, as described above. Although, in the example illustrated in section (2) of FIG. 5, the parity data P21 of four sectors are generated from the data D21, D22, D23, and D24, each of which is data of four sectors, the data D21, D22, D23, and D24 and the parity data P21 each are not necessarily data of four sectors.

When the memory controller 10 reads data from pages in the respective data blocks (first data blocks) in section (1) of FIG. 5, the memory controller 10 determines whether or not data have been successfully written with respect to each unit of processing when an error-correcting code is generated. For example, when the unit of processing when an error-correcting code is generated is data of four sectors, the memory controller 10 reads four sectors of data and an error-correcting code corresponding to the data from each page in each data block (first data block). The memory controller 10 determines that data have been successfully written into the data of four sectors when there is no error in the data of four sectors or, although there is an error in the data of four sectors, the error is correctable using the corresponding error-correcting code and determines that data have not been successfully written into the data of four sectors when there is an error in the data of four sectors and the error is uncorrectable even using the corresponding error-correcting code (that is, there have occurred an error exceeding error correction capability of the corresponding error-correcting code). When the memory controller 10 determines that data have been successfully written, the memory controller 10 performs the operations in section (2) of FIG. 5 and thereafter.

Figure 6:
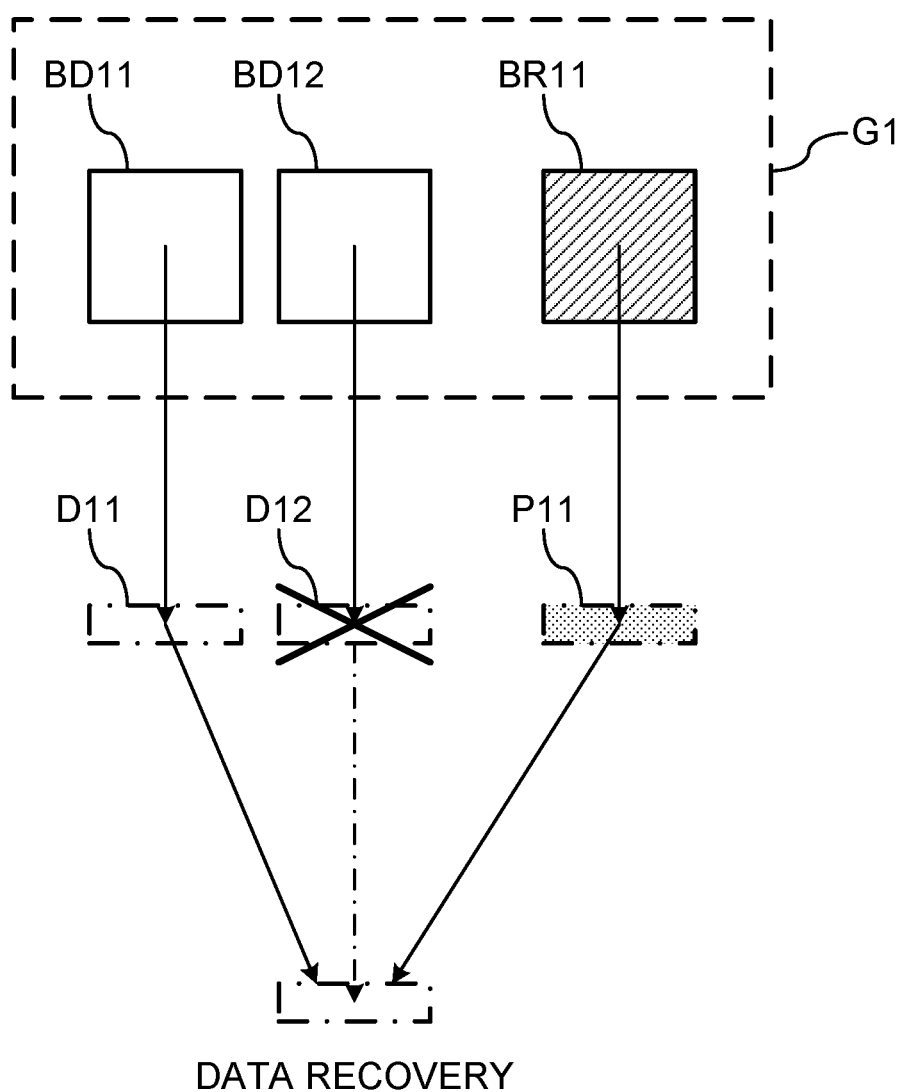
FIG. 6 is a diagram illustrating an outline of data recovery performed by the memory controller according to Embodiment 1 of the present disclosure.

Referring to FIG. 6, an outline of operation of the memory controller 10 in the case where data have not been successfully written into one of the pages in the data blocks (first data blocks) will be described. FIG. 6 illustrates an example in the case where data have not been successfully written into one of the pages in the data block BD12.

On this occasion, the memory controller 10 reads the data D11, into which data have been successfully written, from a page in the data block BD11, which belongs to the same group G1 as the data block BD12. The data D11 are data of the same group as the error data D12, into which data have not been successfully written. Further, the memory controller 10 reads the parity data P11 that have been successfully written into a page in the redundant block BR11, which also belongs to the group G1 that is classified as a first group. The parity data P11 are also data of the same group as the error data D12. In other words, data and parity of the same group as the error data D12 are read. The memory controller 10 recovers the error data D12, based on the data D11 and the parity data P11, which are data of the same group as the error data D12. Specifically, when the parity data P11 written into the redundant block BR11 are horizontal parity, the error data D12 can be recovered by calculating exclusive ORs of the data D11 and the parity data P11, which are read from pages corresponding to the error data D12 in the data blocks BD11 and the redundant block BR11, respectively.

Therefore, even when an error exceeding the error correction capability of an error-correcting code occurs at the time of data writing into the data block BD12, the memory controller 10 is capable of recovering data written into the data block BD12, using parity written into the redundant block BR11.

In addition, when one of the pieces of data in a data block (second data block) in the storage area have not been successfully written, the memory controller 10, as with the case of the cache area, is also capable of recovering error data, based on data that have successfully been written into the other data blocks and parity data that have successfully been written into the redundant block. In this processing, data and parity data of the same group as the error data are used for the recovery of data. In other words, the data that have successfully been written into the other data blocks and the parity data that have successfully been written into the redundant block are data and parity data of the same group as the error data. Note that, when data corresponding to error data in a data block in the storage area remain in a data block (first data block) in the cache area, the memory controller 10 may recover data by reading the data from the corresponding first data block.

As schematically described above, even when an error occurring at the time of writing of data required to be saved cannot be recovered using an error-correcting code, the memory controller 10 enables the data to be recovered, using parity data written into the redundant block. Therefore, it is possible to secure high reliability with respect to data saved in the cache area and the storage area. Note that, although, since redundancy of a group that is configured in the cache area and classified as a first group is higher than redundancy of a group that is configured in the storage area and classified as a second group, capability of data recovery in the cache area excels that in the storage area, storage efficiency of data in the storage area excels that in the cache area.

Note also that the numbers of data blocks and redundant blocks per group are determined taking into consideration balance between redundancy and capacity efficiency. For example, when the number of redundant blocks is one, the larger the number of data blocks per group is, the higher the capacity efficiency becomes. However, since the larger the number of data blocks per group is, the higher an occurrence rate of error per group becomes, redundancy becomes low. This is because, when the number of pieces of error data that have not successfully been written among pieces of data of the same group exceeds the number of pieces of parity data of the same group as the error data, it becomes impossible to recover the error data.

Referring to FIG. 1 again, the configuration of the memory controller 10 will be described. The memory controller 10 includes a memory interface 11, a control circuit 12, a RAM 13, a ROM 14, and a host interface 15.

The memory interface 11 is an interface for communicating with the flash memory 2. The memory interface 11 is a memory interface conforming to, for example, the open NAND flash interface (ONFI) standard.

The control circuit 12 transmits and receives data to and from the host system 3 via the host interface 15 and controls the flash memory 2 via the memory interface 11. The control circuit 12 includes a central processing unit (CPU) and peripheral circuits. The CPU reading and executing control programs stored in the ROM 14 causes functions of respective functional units, which will be described later, to be achieved. The control circuit 12 is an example of circuitry according to the present disclosure.

The RAM 13 temporarily stores work data necessary for the CPU to execute the afore-described control programs, data received from the host system 3, data read from the flash memory 2, and the like. In other words, the RAM 13 functions as a buffer memory. Further, the RAM 13 stores a group management table, which will be described later. The RAM 13 is, for example, a volatile memory that is accessible at high speed, such as a static random access memory (SRAM) and a dynamic random access memory (DRAM). The RAM 13 is an example of a storage according to the present disclosure.

The ROM 14 stores the afore-described control programs. The ROM 14 is, for example, a programmable read-only memory (PROM) or an electrically erasable programmable read-only memory (EEPROM).

The host interface 15 is an interface for communicating with the host system 3. The host interface 15 is, for example, an interface conforming to the serial advanced technology attachment (SATA) standard or an interface conforming to the non-volatile memory express (NVMe) standard.

Figure 7:
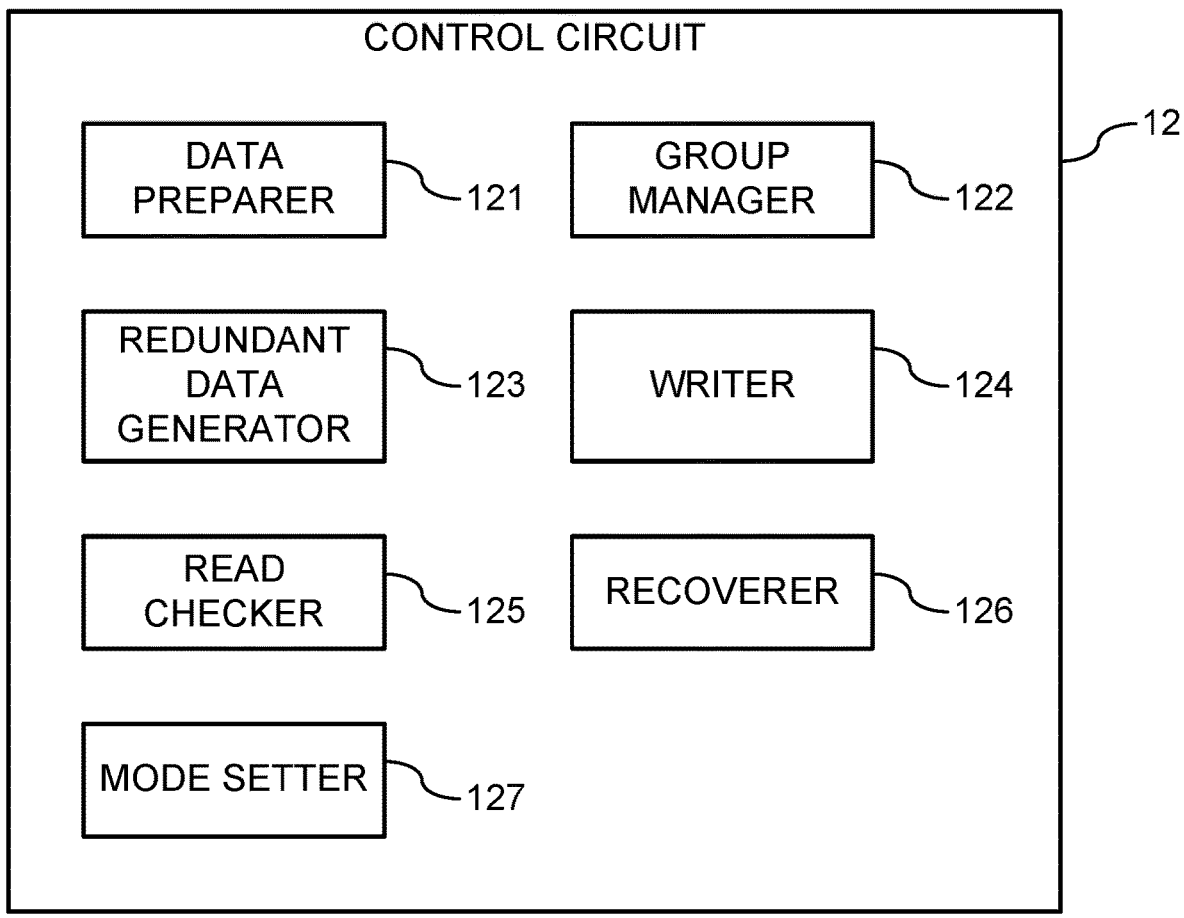
FIG. 7 is a block diagram illustrating a functional configuration of a control circuit of the memory controller according to Embodiment 1 of the present disclosure.

Referring to FIG. 7, respective functional units in the control circuit 12, which are achieved by the CPU of the control circuit 12 reading and executing control programs stored in the ROM 14, will be described. The control circuit 12 includes, as functional constituent components, a data preparer 121, a group manager 122, a redundant data generator 123, a writer 124, a read checker 125, a recoverer 126, and a mode setter 127.

The data preparer 121 prepares data required to be saved in the cache area in units of a page, as illustrated in the afore-described FIG. 4. For example, the data preparer 121, by partitioning data for which a write request has been issued by the host system 3 in units of a page and storing the partitioned data in the RAM 13, prepares data required to be saved in the cache area in units of a page. In addition to the above, when, although not data from the host system 3, data required to be newly written into the cache area due to the convenience of management emerge, the data preparer 121 prepares the data in units of a page.

In addition, the data preparer 121 reads data required to be saved in the storage area from data blocks (first data blocks) in the cache area and prepares the data required to be saved in the storage area in units of a page, as illustrated in the afore-described FIG. 5. Note that reading of data is performed by the read checker 125, which will be described later. The data preparer 121 reads data required to be saved in the storage area from the cache area and prepares the data in units of a page when, for example, no request is issued from the host system 3 and the flash memory system 1 is thus in an idle state. As described afore, writing data equivalent to four pages into the storage area requires data equivalent to four pages in the cache area. As such, the data preparer 121 prepares data equivalent to four pages in the storage area by reading data equivalent to two pages from each of two data blocks (first data blocks).

As illustrated in the afore-described FIG. 3, the group manager 122 configures a plurality of blocks in the cache area, which is set to the SLC mode, into a group classified as a first group and allocates the plurality of blocks constituting the group to data blocks (first data blocks) and a redundant block (first redundant block). Similarly, the group manager 122 configures a plurality of blocks in the storage area, which is set to the MLC mode, into a group classified as a second group and allocates the plurality of blocks constituting the group to data blocks (second data blocks) and a redundant block (second redundant block). As described afore, the group manager 122 configures a ratio of a redundant block in a group classified as a second group to be lower than a ratio of a redundant block in a group classified as a first group. In other words, the group manager 122 sets the redundancy of a group classified as a second group lower than the redundancy of a group classified as a first group.

The group manager 122 writes information indicating a correspondence relationship between a group and blocks and information indicating an allocation of data blocks and a redundant block into the group management table stored in the RAM 13. The group management table is, for example, a table illustrated in FIG. 8. Each row in the table illustrated in FIG. 8 indicates a group.

FIG. 8A illustrates a group management table indicating constitutions of groups classified as first groups (groups in the cache area). Each group classified as a first group is made up of two data blocks and a redundant block. In FIG. 8A, for example, a group made up of blocks #0, #1, and #2 and a group made up of blocks #3, #4, and #5 are illustrated. In the group made up of the blocks #0, #1, and #2, the blocks #0 and #1 are allocated to data blocks and the block #2 is allocated to a redundant block. In the group made up of the blocks #3, #4, and #5, the blocks #3 and #4 are allocated to data blocks and the block #5 is allocated to a redundant block.

FIG. 8B illustrates a group management table indicating constitutions of groups classified as second groups (groups in the storage area). Each group classified as a second group is made up of four data blocks and a redundant block. In FIG. 8B, for example, a group made up of blocks #100, #101, #102, #103, and #104 and a group made up of blocks #105, #106, #107, #108, and #109 are illustrated. In the group made up of the blocks #100, #101, #102, #103, and #104, the blocks #100, #101, #102 and #103 are allocated to data blocks and the block #104 is allocated to a redundant block. In the group made up of the blocks #105, #106, #107, #108, and #109, the blocks #105, #106, #107 and #108 are allocated to data blocks and the block #109 is allocated to a redundant block.

The group manager 122, by writing information into the group management table in this form, manages information indicating a correspondence relationship between a group and blocks and information indicating an allocation of data blocks and a redundant block. Note that, although blocks allocated in a group classified as a first group are used in the SLC mode and blocks allocated in a group classified as a second group are used in the MLC mode, it may be configured such that, by exchanging blocks allocated in a group classified as a first group and blocks allocated in a group classified as a second group, deterioration of the respective blocks is equalized.

The redundant data generator 123 calculates parity, based on data written into a plurality of pages and thereby generates parity data that are redundant data in both a case where the data are saved in the cache area and a case where the data are saved in the storage area, as illustrated in the afore-described FIGS. 4 and 5. As described afore, the redundant data generator 123, for example, sets as parity data horizontal parity that is obtained by calculating exclusive ORs of pieces of data each of which is written into a page in one of the data blocks. Since data written into pages in the respective data blocks are data required to be saved that the data preparer 121 has prepared in units of a page, it can be said that the redundant data generator 123 generates redundant data, based on data required to be saved.

The writer 124 writes pieces of data of the same group that the data preparer 121 has prepared in units of a page into pages in the respective data blocks belonging to the same group and writes parity data that the redundant data generator 123 has generated based on the above-described pieces of data into a page in the redundant block belonging to the above-described group in both a case where the data are saved in the cache area and a case where the data are saved in the storage area, as illustrated in the afore-described FIGS. 4 and 5. In addition, when there is an error that cannot be corrected using an error-correcting code in data read from a data block (first data block) in the case where data written into data blocks (first data blocks) in the cache area are to be saved in the storage area, the writer 124 writes, in place of the read data, data that the recoverer 126, which will be described later, has recovered into a page in a data block (second data block) in the storage area. In addition, the writer 124, referring to the group management table stored in the RAM 13, identifies data blocks and a redundant block that are targets of writing of the data.

The read checker 125 determines whether or not data are successfully written with respect to pages into which data have been written by the writer 124. Specifically, the read checker 125 first reads data and a corresponding error-correcting code from each page to be determined in units of processing when an error-correcting code is generated. The read checker 125 determines that data are successfully written into the page when there is no error in all the data in the page or, although there is an error in the data, the error can be corrected using a corresponding error-correcting code and determines that data are not successfully written into the page when there is an error in the data and the error cannot be corrected even using a corresponding error-correcting code. Hereinafter, the read checker 125 reading data from a page in a block and determining whether or not data are successfully written is referred to as "to read-check". This read-checking may be performed every time data are written or collectively performed after all data writing in units of a block has been completed.

The recoverer 126 recovers data, based on data and parity data of the same group as error data that have not been successfully written, with respect to both the cache area and the storage area, as illustrated in the afore-described FIG. 6. In other words, the recoverer 126 recovers data, based on data and parity data that have successfully been written into the other blocks constituting the group to which the block in which error data are included belongs. Note that, although FIG. 6 illustrates an example in a group classified as a first group, exactly the same applies to a group classified as a second group.

The mode setter 127 sets the cells in blocks allocated to the cache area to the SLC mode and the cells in blocks allocated to the storage area to the MLC mode. The modes are set in units of a block. The mode setter 127 may fix blocks to be set to the SLC mode or the MLC mode or dynamically change blocks to be set to the SLC mode or the MLC mode. For example, the mode setter 127 may reserve free space in the flash memory 2 by decreasing the number of cells to be set to the SLC mode and increasing the number of cells to be set to the MLC mode when only a small amount of free space is available.

Figure 9:
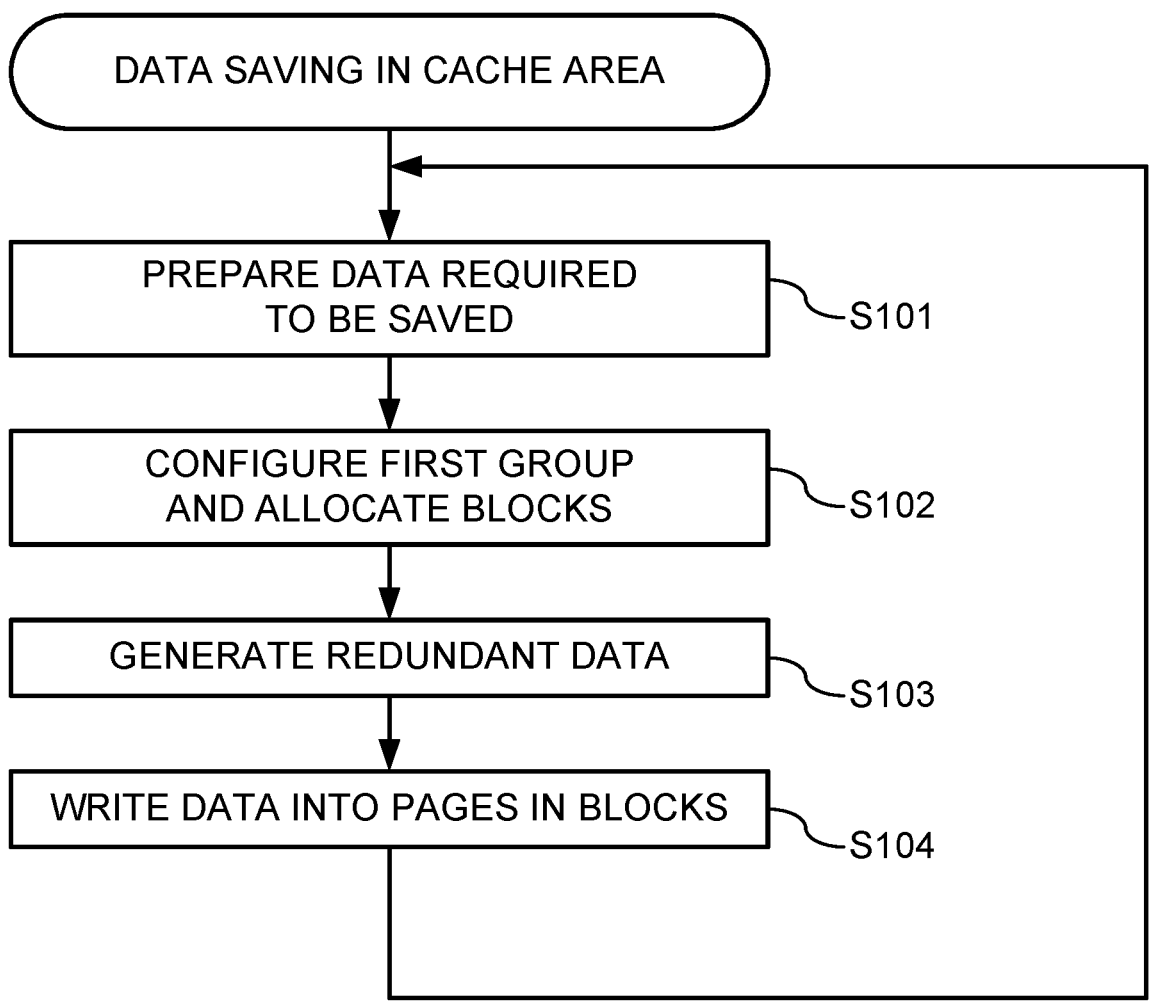
FIG. 9 is a flowchart illustrating an example of operation of data saving in the cache area performed by the memory controller according to Embodiment 1 of the present disclosure.

Next, referring to FIG. 9, an example of operation of data saving in the cache area performed by the memory controller 10 will be described. The operation illustrated in FIG. 9 is started based on a write command provided by the host system 3. Note that the operation of the memory controller 10 illustrated in FIG. 9, for example, becomes executable after the CPU of the control circuit 12 has read and executed the control programs stored in the ROM 14 and start-up processing has been finished.

The data preparer 121 of the control circuit 12 in the memory controller 10 prepares data required to be saved in the cache area (step S101). As described afore, the data preparer 121 prepares data required to be saved in units of a page.

The group manager 122 of the control circuit 12 configures a plurality of blocks in the cache area into a group classified as a first group and allocates the plurality of blocks constituting the group to data blocks (first data blocks) and a redundant block (first redundant block) (step S102). On this occasion, the group manager 122 writes information indicating a correspondence relationship between the group classified as a first group and the blocks and information indicating an allocation of the data blocks and the redundant block into the group management table.

The redundant data generator 123 of the control circuit 12 calculates parity across pieces of data of a page unit that were prepared in step S101 and thereby generates parity data that are redundant data (step S103).

The writer 124 of the control circuit 12 writes data into pages in a plurality of blocks belonging to the same group by writing the data that were prepared in units of a page in step S101 into pages in the data blocks (first data blocks) in the cache area and writing the parity data that were generated in step S103 into pages in the redundant block (first redundant block) in the cache area (step S104). The control circuit 12 repeats the operations in steps S101 to S104.

Figure 10:
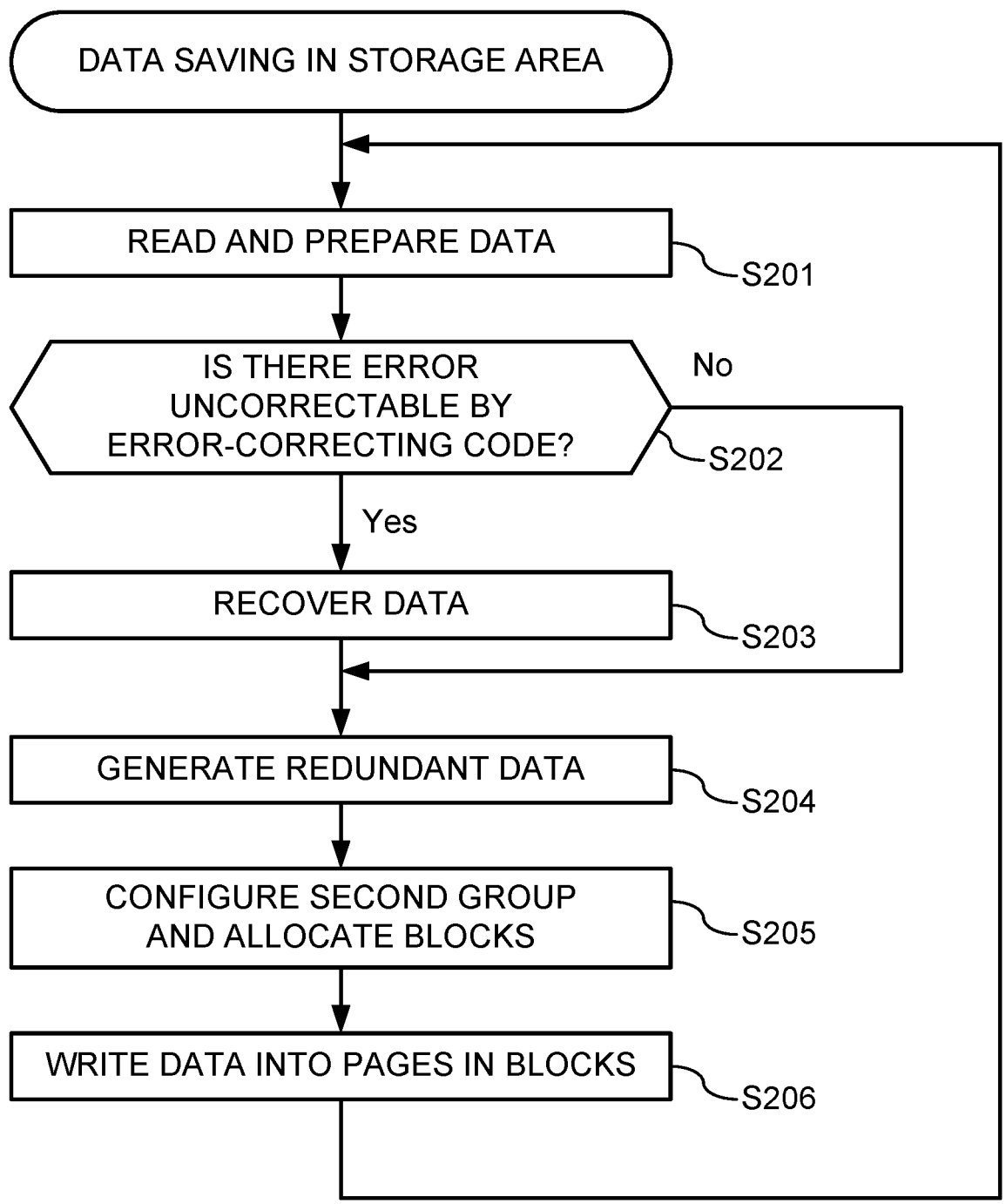
FIG. 10 is a flowchart illustrating an example of operation of data saving in the storage area performed by the memory controller according to Embodiment 1 of the present disclosure.

Next, referring to FIG. 10, an example of operation of data saving in the storage area performed by the memory controller 10 will be described. The operation illustrated in FIG. 10, as with the above-described case of data saving in the cache area, is executed by, for example, the CPU of the control circuit 12.

The data preparer 121 of the control circuit 12 in the memory controller 10 prepares data required to be saved in the storage area in units of a page by reading data from pages in the data blocks (first data blocks) in the cache area by means of the read checker 125 (step S201).

The read checker 125 of the control circuit 12 determines whether or not there is an error that cannot be corrected using an error-correcting code in the data that were read in step S201 (step S202). When there is no error that cannot be corrected (step S202: No), the control circuit 12 transitions to the operations from step S204.

When there is an error that cannot be corrected using an error-correcting code (step S202: Yes), the recoverer 126 recovers data that include the error that cannot be recovered using an error-correcting code, based on data and parity data of the same group as the data including the unrecoverable error (step S203).

The redundant data generator 123 of the control circuit 12 calculates parity data, which are redundant data, across pieces of data each of which is written into a page in one of the data blocks belonging to a group classified as a second group (step S204). The pieces of data each of which is written into a page in one of the data blocks are data that the data preparer 121 read from pages in data blocks (first data blocks) in the cache area and prepared in step S201. Note, however, that, when a piece of data is recovered by the operation in step S203, the recovered data, in place of read data, are data to be written into a page in a data block belonging to the group classified as a second group.

The group manager 122 of the control circuit 12 configures a plurality of blocks in the storage area into a group classified as a second group and allocates the plurality of blocks constituting the group to data blocks (second data blocks) and a redundant block (second redundant block) (step S205). On this occasion, the group manager 122 writes information indicating a correspondence relationship between the group classified as a second group and the blocks and information indicating an allocation of the data blocks and the redundant block into the group management table. Note that the operation in step S205 may be performed before step S201, performed at the succeeding stage to step S201, or performed at the succeeding stage to step S203.

The writer 124 of the control circuit 12 writes data into pages in the blocks constituting the group classified as a second group by writing the data that were prepared in units of a page in step S201 into pages in the data blocks (second data blocks) belonging to the group classified as a second group and writing the parity data that were generated in step S204 into a page in the redundant block (second redundant block) belonging to the group classified as a second group (step S206). Note, however, that, when a piece of data is recovered by the operation in step S203, the writer 124 writes, in place of read data, the recovered data into a page in a data block (second data block).

The control circuit 12 repeats a flow of operations in steps S201 to S206.

Note that the above description was made on the assumption that errors that cannot be recovered using error-correcting codes do not occur in two or more pages of data among data of the same group that are read from the cache area. Since, when there exist errors that cannot be recovered using error-correcting codes in two or more pages of data, data cannot be recovered, the control circuit 12 informs the host system 3 of, for example, information indicating that a fatal error has occurred.

The flash memory system 1 according to Embodiment 1 has been described above. According to the flash memory system 1 according to Embodiment 1, a plurality of blocks in the cache area are configured into a group classified as a first group, the plurality of blocks constituting the group are allocated to data blocks (first data blocks) and a redundant block (first redundant block), and, when data are written into the data blocks (first data blocks), redundant data are also written into the redundant block (first redundant block). As such, it is possible to achieve high data recovery capability with respect to an area used as a cache.

In addition, the flash memory system 1 according to Embodiment 1 similarly enables high recovery capability to be achieved with respect to the storage area. Further, although, since the redundancy of a group that is configured in the storage area, which is classified as a second group, is lower than the redundancy of a group that is configured in the cache area, which is classified as a first group, the data recovery capability in the cache area excels that in the storage area, it is possible to reserve larger free space in the storage area than in the cache area.

Variation of Embodiment 1

In Embodiment 1, it was assumed that two data blocks were allocated in a group classified as a first group and four data blocks were allocated in a group classified as a second group. However, as long as redundancy of a group classified as a second group is lower than redundancy of a group classified as a first group, the number of allocated data blocks may be set at any number. Note that, although the number of pieces of data (the number of pieces of data of a page unit) belonging to the same group changes depending on the number of data blocks allocated in a group, parity data may similarly be calculated regardless of the number of pieces of data belonging to the same group.

In Embodiment 1, although it was assumed that a redundant block (second redundant block) was allocated in a group (group classified as a second group) configured in the storage area, a redundant block (second redundant block) does not necessarily have to be allocated in a group classified as a second group. Even when an error occurs in written data at the time of reading data from the cache area and writing the data into a data block (second data block) in the storage area, it is possible to read the same data from the cache area again and write the data into the second data block. Therefore, even when no redundant block (second redundant block) is included in a group classified as a second group, it is possible to write data including no error into the storage area. This variation is suitable for, for example, a case where the flash memory 2 has characteristics that error correction capability of only an error-correcting code is sufficient to cope with an error at any time except at data writing. Note that it may be configured such that a redundant block (second redundant block) is not allocated in only some groups classified as second groups.

Embodiment 2

In the flash memory system 1 according to Embodiment 1, it was assumed that a redundant block (first redundant block) was allocated per group classified as a first group. On the other hand, a flash memory system 1 according to Embodiment 2, which will be described below, differs from Embodiment 1 in that two redundant blocks (first redundant blocks) are allocated per group. The flash memory system 1 according to Embodiment 2 is suitable for, for example, a case where a flash memory 2 having characteristics that errors are highly likely to occur to the extent that error correction capability of only one redundant block (first redundant block) is insufficient to cope with errors occurring at the time of data writing is controlled. Note that it may be configured such that two redundant blocks (first redundant blocks) are allocated in only some groups classified as first groups and a redundant block (first redundant block) is allocated in the other groups.

A configuration of the flash memory system 2 according to Embodiment 2 is similar to those illustrated in FIGS. 1 and 7, and a detailed description thereof will thus be omitted. Since operation of the flash memory system 1 is also similar to that in Embodiment 1, a description thereof will be omitted. In the following description, an outline of differences between Embodiment 2 and Embodiment 1 will be described.

Figure 11:
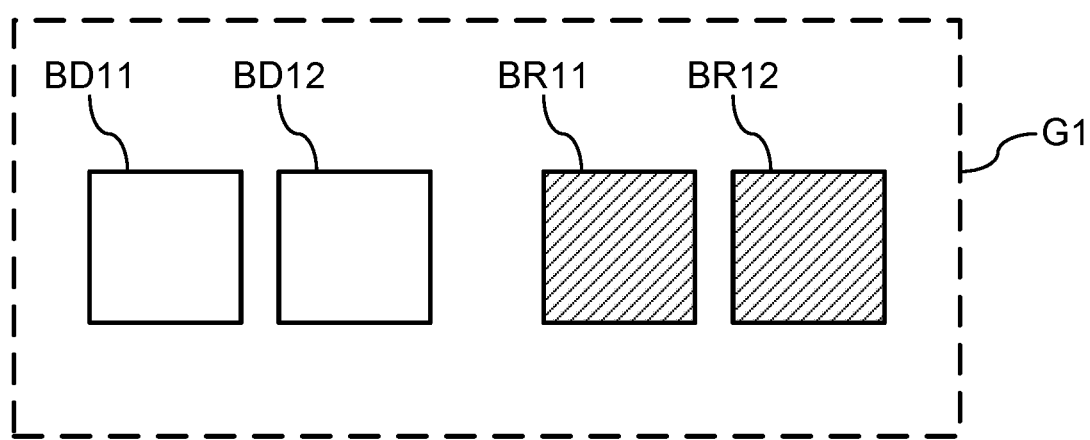
FIG. 11 is a diagram illustrating an example of a first group configured by a memory controller according to Embodiment 2 of the present disclosure.

As illustrated in FIG. 11, a group manager 122 allocates two data blocks (first data blocks) and two redundant blocks (first redundant blocks) in a group classified as a first group. Note that allocation of data blocks and a redundant block in a group classified as a second group is similar to that in Embodiment 1. In the example illustrated in FIG. 11, among the respective blocks in a group G1 classified as a first group, two blocks are allocated to data blocks BD11 and BD12, and two blocks are allocated to redundant blocks BR11 and BR12.

Figure 12:
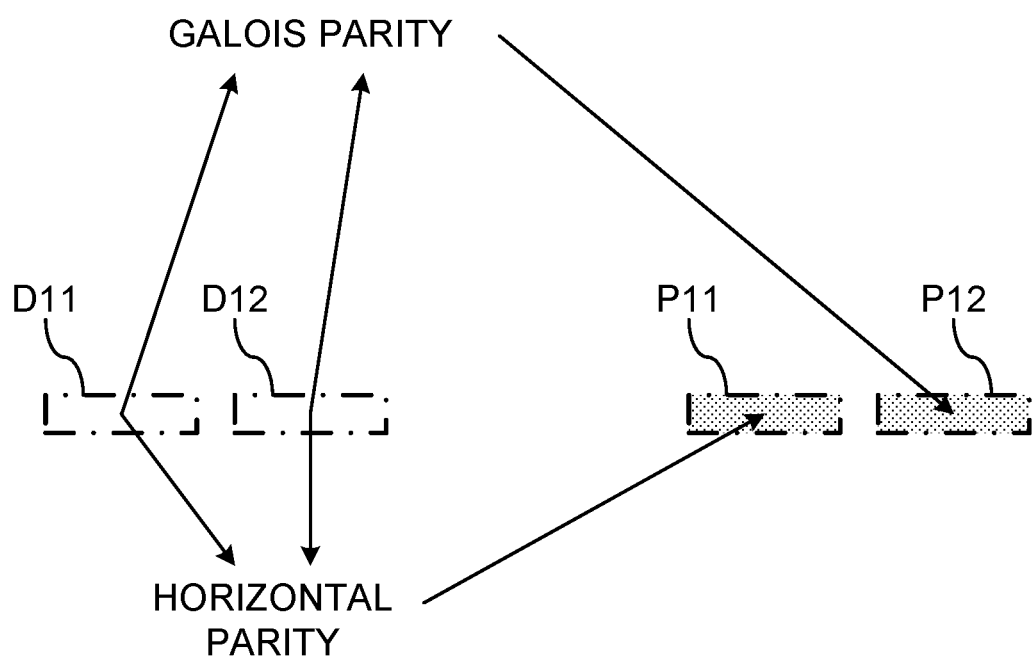
FIG. 12 is a diagram illustrating an outline of parity data generation performed by the memory controller according to Embodiment 2 of the present disclosure.

As illustrated in FIG. 12, a redundant data generator 123 generates two types of parity data by calculating two types of parity across pieces of data required to be written into the data blocks (first data blocks) belonging to a group classified as a first group. In the example illustrated in FIG. 12, the redundant data generator 123 generates parity data P11 and P12 by calculating horizontal parity and Galois parity across data D11 and D12 required to be written into the data blocks BD11 and BD12. The horizontal parity is calculated by means of exclusive ORs across respective pieces of data, as described in Embodiment 1. The Galois parity is calculated by performing Galois field operations in a Galois field across respective pieces of data. The parity data P11 and P12 are written into the redundant blocks BR11 and BR12, respectively, by a writer 124. Note that each of the data D11 and D12 is a unit of processing when an error-correcting code is generated.

Recovery of data when there is an error that cannot be corrected using an error-correcting code in data written into a page in a data block (first data block) after writing belonging to a group classified as a first group is generally the same as that in Embodiment 1. In Embodiment 2, however, since two types of parity data are written into two first redundant blocks, a recoverer 126 is capable of recovering data, based on the two types of parity data even when there are errors that cannot be corrected using error-correcting codes in both of two pieces of data of the same group read from data blocks (first data blocks) belonging to a group classified as a first group. Note that each of two pieces of data of the same group corresponds to data of a unit of processing when an error-correcting code is generated.

The flash memory system 1 according to Embodiment 2 has been described above. According to the flash memory system 1 according to Embodiment 2, since two first redundant blocks are allocated in a group classified as a first group in the cache area, it is possible to achieve higher data recovery capability than Embodiment 1 with respect to an area used as a cache.

Variation of Embodiment 2

Although, in Embodiment 2, the number of first redundant blocks to be allocated in a first group was assumed to be two, the number of first redundant blocks may be three or more. Although three or more types of parity data are needed in this case, three or more types of parity data can be generated because preparing a plurality of methods of Galois field operations enables a plurality of types of Galois parity to be calculated.

In Embodiment 2, although it was assumed that a redundant block (second redundant block) was allocated in a group classified as a second group in the storage area, a redundant block (second redundant block) does not necessarily have to be allocated in a group classified as a second group or two or more redundant blocks (second redundant blocks) may be allocated in a group classified as a second group within a range satisfying a condition that redundancy of a group classified as a second group is lower than redundancy of a group classified as a first group.

In addition, in Embodiment 2, as with the variation of Embodiment 1, the number of data blocks (first data blocks) allocated in a group classified as a first group and the number of data blocks (second data blocks) allocated in a group classified as a second group can be appropriately set within a range satisfying a condition that redundancy of a group classified as a second group is lower than redundancy of a group classified as a first group.

Embodiment 3

In Embodiments 1 and 2, redundant data were parity data generated by calculating parity across pieces of data that are written into data blocks. On the other hand, in Embodiment 3, which will be described below, redundant data in a cache area are not parity data, but the same data as data to be written into a data block.

Figure 13:
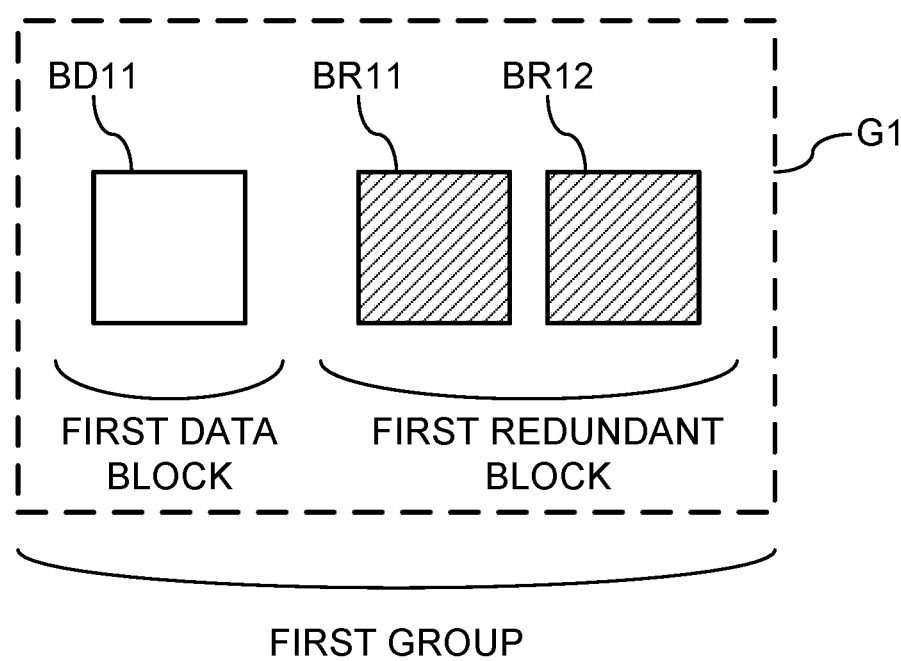
FIG. 13 is a diagram illustrating an example of a first group configured by a memory controller according to Embodiment 3 of the present disclosure.

In Embodiment 3, a data block (first data block) and one or more redundant blocks (first redundant blocks) are allocated in a group classified as a first group, as illustrated in FIG. 13. In FIG. 13, in a group G1 classified as a first group, a data block BD11 and two redundant blocks BR11 and BR12 are allocated. Although the number of redundant blocks allocated in a group classified as a first group may be any number of one or more, it is preferable to assign a number that makes sufficient recovery capability with respect to an error occurring at the time of data writing. Therefore, the number of redundant blocks to be allocated is determined based on, for example, characteristics of a flash memory 2.

A configuration of the flash memory system 1 according to Embodiment 3 is similar to those illustrated in FIGS. 1 and 7, and a detailed description thereof will thus be omitted. Since operation of the flash memory system 1 is also similar to that in Embodiment 1, a description thereof will be omitted. In the following description, an outline of differences between Embodiment 3 and Embodiment 1 will be described.

As illustrated in FIG. 13, a group manager 122 allocates a data block (first data block) and two redundant blocks (first redundant blocks) in a group classified as a first group. Note that allocation of data blocks and a redundant block in a group classified as a second group is similar to that in Embodiment 1. In the example illustrated in FIG. 13, among the respective blocks in the group G1 classified as a first group, a block is allocated to a data block BD11, and two blocks are allocated to redundant blocks BR11 and BR12.

Figure 14:
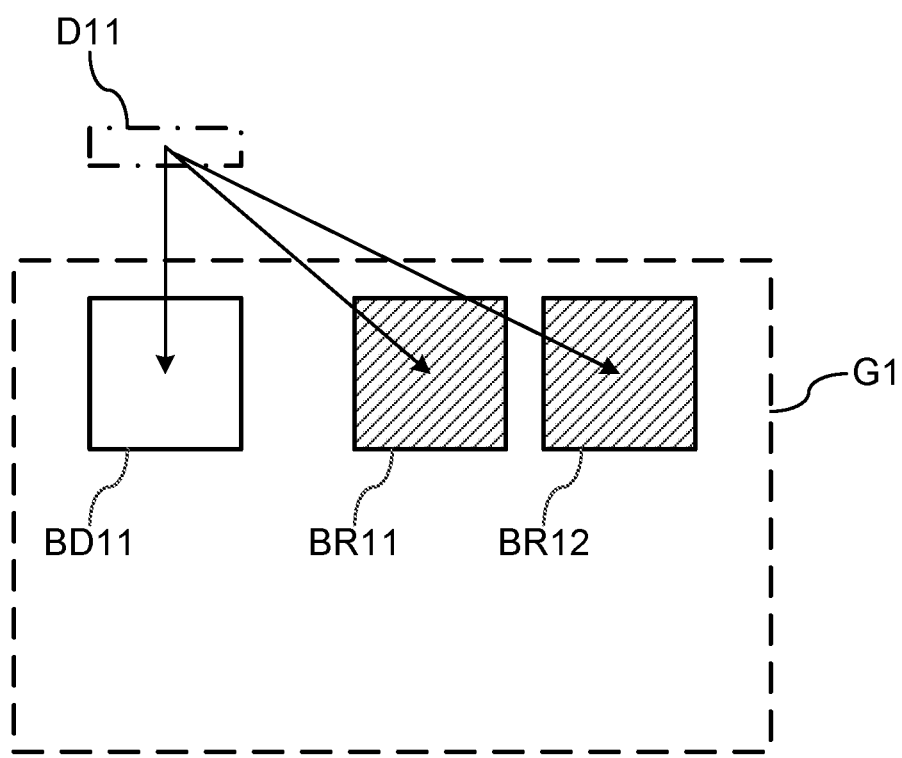
FIG. 14 is a diagram illustrating an outline of data writing performed by the memory controller according to Embodiment 3 of the present disclosure.

As illustrated in FIG. 14, a writer 124 writes data that a data preparer 121 has prepared into a data block belonging to a group classified as a first group and writes the same data as the data written into the data block into redundant blocks as redundant data. In the example illustrated in FIG. 14, the same data D11 are written into the data block BD11 and the redundant blocks BR11 and BR12.

Figure 15:
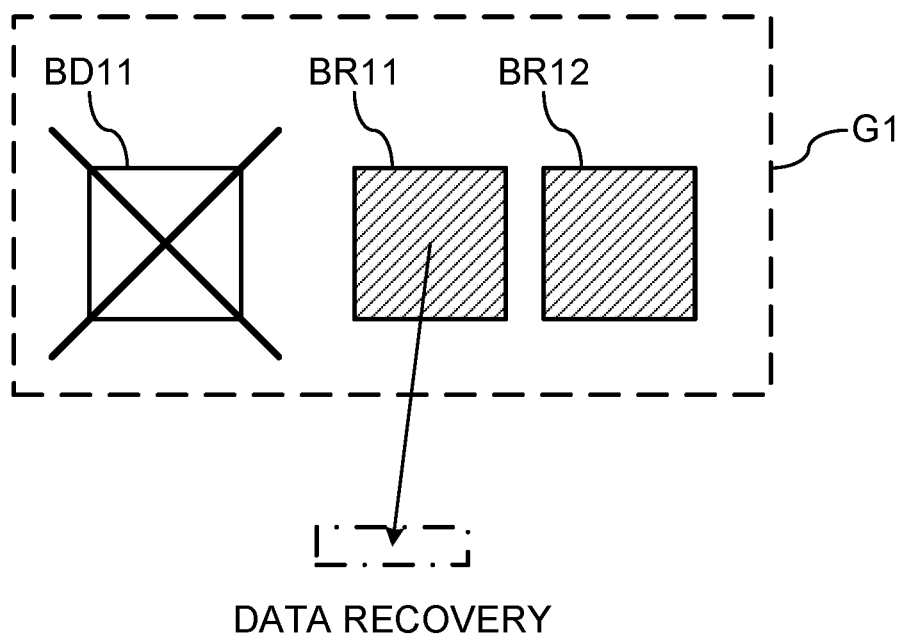
FIG. 15 is a diagram illustrating an outline of data recovery performed by the memory controller according to Embodiment 3 of the present disclosure.

As illustrated in FIG. 15, when there is an error that cannot be corrected using an error-correcting code in data read from the data block, a recoverer 126 recovers the data by reading data of the same group as the data, that is, data written into one of the redundant blocks (first redundant blocks) belonging to the same group as the data block in which the data have been stored. Since the same data as the data read from the data block are written into the redundant blocks (first redundant blocks) as redundant data, reading data from either of the redundant blocks (first redundant blocks) enables the data to be recovered. In the example illustrated in FIG. 15, there is an error that cannot be corrected using an error-correcting code in the data read from the data block BD11, the data is recovered by reading data of the same group as the data from the redundant block BR11. Needless to say, it may be configured such that data are read from the redundant block BR12 instead of the redundant block BR11.

The flash memory system 1 according to Embodiment 3 has been described above. The flash memory system 1 according to Embodiment 3, as with Embodiment 1, enables high data recovery capability to be achieved with respect to an area used as a cache. Since, differing from Embodiment 1, it is not necessary to calculate parity at the time of data writing into the cache area, a calculation load is low.

Variation of Embodiment 3

In Embodiment 3, allocation of data blocks (second data blocks) and a redundant block (second redundant block) in a group classified as a second group in the storage area is the same as Embodiment 1, and, as with Embodiment 1, parity data are written into the redundant block as redundant data. However, with respect to a second group, it may be configured such that, as with a first group, one or more redundant blocks (second redundant blocks) are allocated in a group classified as a second group and the same data as data in a data block are written into the redundant blocks as redundant data. Note, however, that the number of second redundant blocks allocated in a second group is determined in such a way that redundancy of a group classified as a second group is lower than redundancy of a first group.

In addition, in Embodiment 3, as with the variation of Embodiment 1, the number of first data blocks allocated in a group classified as a first group and the number of second data blocks allocated in a group classified as a second group may be any number of two or more as long as redundancy of a second group is lower than redundancy of a first group.

(Other Variations)

Although, in the above-described respective embodiments, the flash memory 2 was assumed to be a NAND-type flash memory, the flash memory 2 may be a memory other than a NAND-type flash memory as long as the flash memory 2 is a memory that is capable of changing the number of bits storable in each cell.

Although, in the above-described respective embodiments, each cell of the flash memory 2 was assumed to be an MLC, each cell of the flash memory 2 may be another type of p-bit MLC. In addition, each cell may be a cell to which a mode other than the SLC mode and the MLC mode can be set. For example, each cell may be a cell that is a QLC and to which the MLC mode and the QLC mode can be set.

In the above-described respective embodiments, it was assumed that the respective functional units of the control circuit 12 were achieved by the CPU disposed in the control circuit 12 executing control programs. However, the control circuit 12 may include an application specific integrated circuit (ASIC) in place of the CPU, and the respective functional units of the control circuit 12 may be achieved by the ASIC. Alternatively, the control circuit 12 may include both the CPU and the ASIC, and some functions of the control circuit 12 may be achieved by the ASIC. For example, since processing, such as calculation of an error-correcting code, error correction using an error-correcting code, calculation of Galois parity, and data recovery using Galois parity, are processing requiring a high load, an ASIC dedicated to such processing may be disposed in the control circuit 12 and the ASIC may execute the processing.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A memory controller comprising:
   circuitry, wherein
   the circuitry
      sets a physical block in a flash memory to a first storage mode allowing information of n (n is a positive integer) bits or less to be stored in each cell or a second storage mode allowing information of more than n bits to be stored in each cell,
      configures a plurality of first physical blocks set to the first storage mode into a first group,
      configures a plurality of second physical blocks set to the second storage mode into a second group,
      allocates the plurality of first physical blocks constituting the first group to a first data block and a first redundant block,
      allocates the plurality of second physical blocks constituting the second group to a second data block and zero or more second redundant blocks,
      writes data required to be saved into the first data block,
      writes first redundant data based on the data required to be saved into the first redundant block belonging to the same first group as the first data block,
      writes replicated data of the data written into the first data block into the second data block, and
      writes second redundant data based on the replicated data into the second redundant block belonging to the same second group as the second data block, and
   a ratio of a data amount of the first redundant data to a data amount of the data required to be saved is greater than a ratio of a data amount of the second redundant data to a data amount of the replicated data.

2. The memory controller according to claim 1, wherein
   the circuitry further
      writes, in conjunction with data to be written into the first data block, a first error-correcting code based on the data into the first data block, and
      writes, in conjunction with data to be written into the second data block, a second error-correcting code based on the data into the second data block,
   the first error-correcting code is generated using a sector of or a plurality of sectors of data as a unit of processing,
   the first redundant data are parity data generated with respect to each piece of data into which a plurality of pieces of data of a unit of processing when the first error-correcting code is generated are collected,
   the second error-correcting code is generated using a sector of or a plurality of sectors of data as a unit of processing, and
   the second redundant data are parity data generated with respect to each piece of data into which a plurality of pieces of data of a unit of processing when the second error-correcting code is generated are collected.

3. The memory controller according to claim 2, wherein the circuitry further performs correction processing of correcting an error included in data written into the first data block or the second data block, based on the first error-correcting code or the second error-correcting code, and when an error included in data cannot be corrected by the correction processing, recovers data written into the first data block or the second data block, based on the parity data.

4. The memory controller according to claim 1, wherein the first redundant data are same data as data to be written into the first data block, and the circuitry recovers data written into the first data block by reading and acquiring data successfully written into the first redundant block.

5. The memory controller according to claim 1 further comprising a storage storing a group management table for managing the first group and the second group, wherein the circuitry further writes information indicating a correspondence relationship between a group and a plurality of physical blocks and information indicating an allocation of a data block and an allocation of a redundant block into the group management table, and referring to the group management table, identifies a data block and a redundant block targeted for data writing.

6. A flash memory system comprising:

the memory controller according to claim 1; and the flash memory.

* * * * *